May 11, 1937.                F. W. WOOD                2,080,296
UNIVERSAL JOINT
Filed March 5, 1935
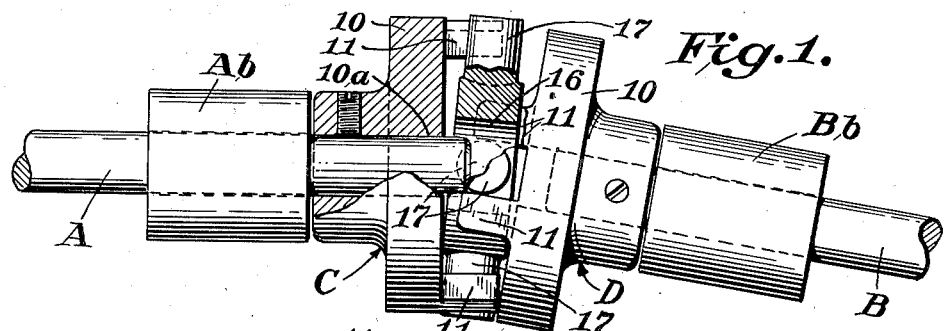
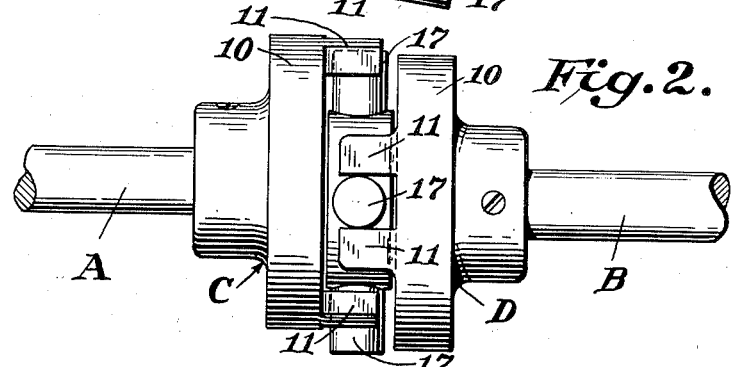
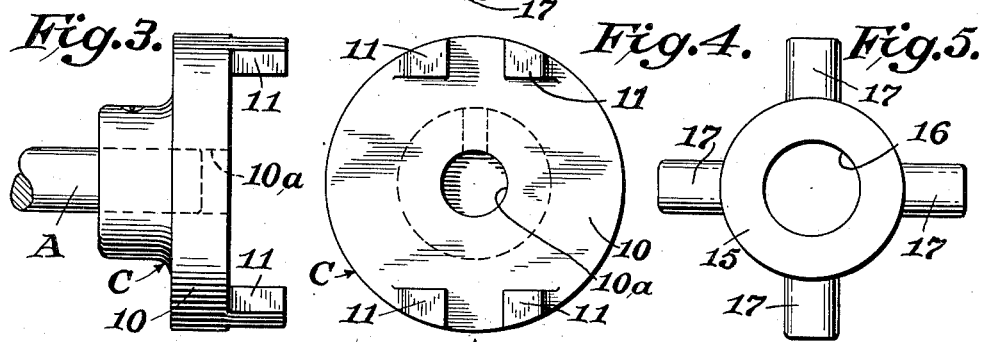
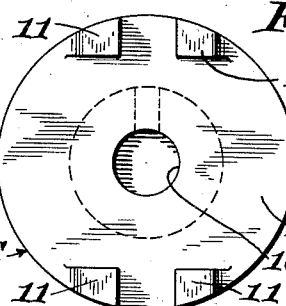
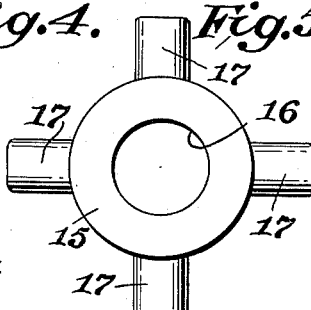
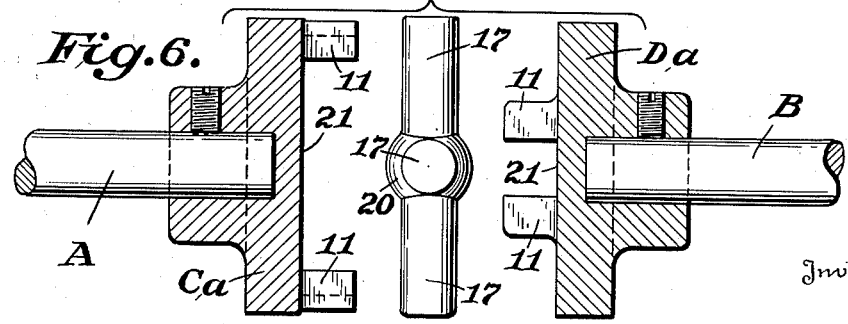
Inventor:
Frederick W. Wood,
By
                                        Attorney.

Patented May 11, 1937

2,080,296

UNITED STATES PATENT OFFICE 2,080,296

UNIVERSAL JOINT

Frederick W. Wood, Philadelphia, Pa., assignor to The Shallcross Company, Philadelphia, Pa., a corporation of Delaware Application March 5, 1935, Serial No. 9,467

3 Claims. (Cl. 64—17)

This invention relates to a universal joint for connecting two revolving elements under conditions by which the revolving elements are not definitely maintained in co-axial relation.

One of the objects of the present invention is to provide a simply and cheaply constructed joint of this type for coupling the elements and permitting adjustment of the alignment while the structure is in use.

Another object of the invention is to provide a universal joint of this type which is capable of maintaining a driving connection and coupling between the revolving elements when the axes of these elements are displaced relatively to one another angularly or by offsetting, or by both types of displacement.

Other objects of the invention will appear in the course of the following description and the claims, and illustrative forms of practicing the invention are shown on the accompanying drawing in which:

Fig. 1 is a side elevation of one form of construction of the invention with the revolving elements illustrated as displaced angularly with respect to one another about the neutral point of the coupling.

Fig. 2 is a side elevation of the same, showing the revolving elements displaced relative to one another but with the axes parallel.

Fig. 3 is a side elevation of one part of the structure.

Fig. 4 is an end elevation of the part shown in Fig. 3.

Fig. 5 is an end elevation of another part of the structure.

Fig. 6 is a diametrical section of a modified form of the invention, showing the shape of the parts, and their position at one stage of assembly thereof.

In the drawing the universal joint is shown as connecting two revolving elements A and B which are illustrated as shafts supported by bearings $Ab$ and $Bb$. The axes of shafts A and B are at an angle to one another. Two end members C and D are each individually secured to a corresponding element A or B.

These end members C and D are identical in shape, as illustrated in Figs. 3 and 4. Each of them comprises a radially extending flange portion or collar 10 having an aperture 10a therethrough to receive the corresponding shaft. These flanges are provided with pairs of axially extending lugs 11 which are illustratively spaced at 180 degrees about the periphery of the flange 10.

The intermediate member of the universal coupling is shown in Fig. 5 illustratively as comprising a ring 15 having a central aperture 16 of larger diameter than the shafts. It has a plurality of radially extending arms 17 which are shown as comprising two pairs with the members of each pair located 180 degrees apart. The arms 17 are cylindrical and their diameters fit in the spacing between the pairs of lugs 11.

In assembling, one pair of arms 17 is fitted between the pairs of lugs 11 on one end member, and the other pair of arms 17 between the lugs on the other end member, the two end members thus presenting their lugs at a peripheral spacing of 90 degrees with respect to one another.

The positions of the shafts A and B are determined by the location of their bearings $Ab$ and $Bb$. With the present structure, end members C and D may be located adjacent the ends of the shafts, and the shafts may extend beyond the adjacent faces of the end members C and D into the apertures 16 (note shaft A in Fig. 1), so that accuracy of fitting and adjusting is not demanded, and the self-aligning features of the structure permit relative displacements so long as the shaft ends do not come into contact with one another or into contact with the inner surface of the ring 15.

Thus, it is possible to assemble the universal joint by bringing one shaft such as B with its end member D into an approximate position, and placing the device in use. Since the end members C and D are identical, the parts may now be aligned by observing their behavior in use, and suitably adjusting the bearing $Bb$ by angular displacement and by the use of shims.

It will be noted that revolution of the shaft B causes the end member D to turn and its lugs to cause a rotation of the intermediate member which in turn actuates the lugs of the other end member C and thus drives the shaft A. If the shafts are merely disaligned by their axes being located at an angle to one another, but both axes intersecting at the neutral point of the coupling, the compensation occurs by rocking of the intermediate member about the surfaces of its arms 17 where they engage with the lugs 11 of the end members. A greater disalignment of the same nature may cause sliding of the arms 17 relative to the engaged surfaces of the lugs 11, but the drive is maintained.

If the shafts, however, are offset with respect to one another, i. e., their axes do not intersect at the neutral point of the intermediate member, as shown in Fig. 2, then the aforesaid rocking about axes passing through the neutral point of the intermediate member, and/or the corresponding sliding, is not always required, but the drive is still maintained by the coupling as the arms 17 slide radially with respect to the lugs 11 and continue their engagement therewith substantially in the neutral plane of the intermediate member.

In Fig. 2, likewise, it will be seen that the device while in use indicates the lack of alignment and permits the gaining of proper alignment by bodily movement without angular displacement of the two shafts A and B, under control of a suitable gage for determining when the peripheral surfaces of end members C and D are coaxial.

In the modification shown in Fig. 6, the intermediate member does not have the central aperture 16, but is provided with a portion providing spherical surfaces 20. The arms 17 engage the pairs of lugs 11 as before, while the end members Ca and Da are illustrated as providing smooth radial end surfaces 21 which engage the spherical surfaces of member 20 and permit these surfaces to roll and/or slide with respect thereto accordingly as the disalignment is a matter of angle and/or offsetting.

The elements are simple and can be easily manufactured. The end members illustrated in Figs. 3 and 4 may be formed by simple turning operations in a lathe to form the peripheral surfaces, the hole 10a for the shaft and the axially directed surfaces of the lugs 11. The lugs may then be formed by a simple milling operation by a tool moving in a path at right angles to the axis of the end member, to form and complete the member to accurate dimensions by a single operation. Likewise, the intermediate member may be formed by die-casting or by other means, without the necessity of close attention to the shape and finish of the non-engaging surfaces, followed by a completion of the arms 17 by a hollow milling or like operation to gain the desired smoothness of the parts. Likewise, the engaging spherical surfaces of portion 20 may be finished in a like manner. The simple shape of the parts permits them to be made of materials appropriate to the work to be performed. The end members may be formed of nitrided steel alloy, or otherwise prepared for maximum resistance to wear. The intermediate member may be made of an insulating material such as a condensate resin where it is desirable to prevent the passage of current from one shaft or revolving element to another. This intermediate member of insulating material may have wear sleeves on its arms 17 to avoid difficulty where extreme wear might occur thereon. The intermediate member likewise may be made entirely of steel alloy with suitable nitride treatment to limit the effects of wear.

In the above description, the term "neutral plane" is used in reference to the radial plane containing the axes of the arms 17; while the neutral point is the point of intersection of the axes of arms 17. Thus, in most universal joints, the relative motion of the parts is about axes passing through the neutral point only, without any sliding of the parts in the directions of such axes as necessitated when the axes of the revolving elements do not intersect at the neutral point.

From the foregoing description, it will be seen that the central portions 15 and 20 of the intermediate members shown in Figs. 1 and 6 respectively, are each of a greater axial thickness than the thickness of the radially extending arms 17.

It is obvious that the invention is not limited to the forms of constructions shown, but that it may be employed in many ways within the scope of the claims.

I claim:

1. A universal joint for connecting two revolving shafts, comprising end members having holes for receiving said shafts and being secured thereto, and an intermediate element comprising a ring having an aperture of greater diameter than said shafts and a plurality of radially extending arms peripherally spaced about the ring, said end members having spaced pairs of lugs extending axially and engaged with said arms, the pairs of lugs on each end member being spaced 180 degrees from one another and located at 90 degrees from the pairs of lugs of the other end member, at least one said shaft extending through its end member into the central aperture of the ring.

2. A universal joint for connecting two revolving elements, comprising end members secured to said elements and each having a smooth end face, and an intermediate member, each of said end members also having spaced pairs of lugs projecting from said end face and extending axially toward the other end member, said intermediate member including a central portion and portions extending outwardly therefrom and peripherally spaced for fitting between each of said pairs of lugs for sliding and rocking movement relative to the engaged surfaces, the central portion of said intermediate member having a greater axial thickness than the outward portions.

3. A universal joint for connecting two revolving elements, comprising end members secured to said elements, and an intermediate member including a central portion and portions extending outwardly therefrom and peripherally spaced, each of said end members having a face portion and spaced pairs of lugs projecting from said face portion and extending axially toward the other end member for engaging therebetween the outwardly extending portions on said intermediate member for sliding and rocking movement relative to the engaged surfaces, the central portion of said intermediate member having a greater axial thickness than the outwardly extending portions thereof.

FREDERICK W. WOOD.